United States Patent [19]

Gaonkar

[11] Patent Number: 5,376,397
[45] Date of Patent: Dec. 27, 1994

[54] MICROEMULSIONS OF OIL AND WATER

[75] Inventor: Anilkumar G. Gaonkar, Vernon Hills, Ill.

[73] Assignee: Kraft General Foods, Inc., Northfield, Ill.

[21] Appl. No.: 58,572

[22] Filed: May 6, 1993

[51] Int. Cl.$^5$ ............................................. A23D 7/00
[52] U.S. Cl. .................................. 426/602; 426/651; 426/590
[58] Field of Search ..................... 426/651, 590, 602

[56] References Cited

U.S. PATENT DOCUMENTS

| | | | |
|---|---|---|---|
| 4,146,499 | 3/1979 | Rosano | 252/186 |
| 4,557,734 | 12/1985 | Schwab | 252/357 |
| 4,568,480 | 2/1986 | Thir | 252/312 |
| 4,605,422 | 8/1986 | Goddard | 252/52 |
| 4,835,002 | 5/1989 | Wolf | 426/590 |
| 4,908,154 | 3/1990 | Cook | 426/602 |
| 5,045,337 | 9/1991 | El-Nokaly | 426/611 |
| 5,256,422 | 10/1993 | Albert | 426/603 |
| 5,283,056 | 2/1994 | Chung | 426/651 |

OTHER PUBLICATIONS

Furia 1975 Fenarolia Handbook of Flavor Ingredients vol. II The Chemical Rubber Co. Cleveland Ohio p. 316.

*Primary Examiner*—Carolyn Paden
*Attorney, Agent, or Firm*—Fitch, Even, Tabin & Flannery

[57] ABSTRACT

The present invention is directed to an edible microemulsion which includes an oil which cannot be formed into a microemulsion in a matrix of water and an alcohol selected from the group consisting of ethanol, propylene glycol, glycerine, sugar, sugar alcohol and mixtures thereof, a hydrophilic surfactant, a first water miscible alcohol emulsifying agent, a second water immiscible alcohol emulsifying agent and water.

7 Claims, No Drawings

MICROEMULSIONS OF OIL AND WATER

FIELD OF THE INVENTION

The present invention relates generally to microemulsions of edible oils in a mixture of water, a water miscible alcohol, a water immiscible alcohol and a surfactant.

DESCRIPTION OF THE PRIOR ART

Microemulsions are emulsions formed from water, oil and one or more emulsifying agents or surfactants wherein the individual emulsified particles of oil have a diameter of less than ¼ the wavelength of white light, i.e., a particle size of about 100 to 600Å, although the size of the dispersed droplets permits light to pass through the microemulsion, the system is not necessarily transparent. It is generally referred to as translucent. Such systems remain dispersed and do not achieve equilibrium as microemulsions do, by separating into the original, mutually insoluble liquid phases. With the aid of surfactants, it is possible to produce microemulsions which remain dispersed for periods of time as long as a few days or possibly more. Ultimately, however, macroemulsions achieve equilibrium by separating into the mutually insoluble liquid phases. On the other hand, microemulsions exhibit stability which may be measured in years.

Microemulsions are formed spontaneously, without the need for any energy input when the components thereof are uniformly admixed with each other. Although such microemulsions may be caused to be formed spontaneously, selection of the components therefore and amounts thereof are critical in order to first, obtain such microemulsion and, second, obtain such an emulsion which is stable for any reasonable period of time (S. E. Friburg, J. Dispersion Science & Technology, Vol. 6, No. 3, pp. 317–337, 1985). As reported in the Friburg reference, short chain alcohols, such as isopropanol, which are soluble in the aqueous phase, are not useful as cosurfactants in oil-in-water microemulsions.

U.S. Pat. No. 4,146,499 to Rosano is directed to a method for dispersing a water-immiscible liquid in an aqueous phase as a microemulsion. The method includes the step of selecting a primary surfactant, which is an amphiphatic substance, dissolving the primary surfactant in the water-immiscible liquid, dispersing the solution of the water-immiscible liquid and the primary surfactant into the aqueous phase wherein the water-immiscible liquid is to be dispersed and providing a secondary surfactant in the aqueous phase which has a higher HLB than the primary surfactant.

The Rosano patent discloses a long list of primary surfactants, which can be selected from the group consisting of sorbitan esters of fatty acids having 10 to 22 carbon atoms; polyoxyethylene sorbitan esters of $C_{10}$ to $C_{22}$ fatty acids having up to 80% ethylene oxide; polyoxyethylene sorbitol esters of $C_{10}$ to $C_{22}$ fatty acids; polyoxyethylene derivatives of fatty phenols having 6 to 20 carbon atoms in the fatty group, and up to 80% ethylene oxide; fatty amino and amido betaines having 20 to 22 carbon atoms in the fatty group; fatty alcohols of 5 to 16 carbon atoms; polyoxyethylene condensates of $C_{10}$ to $C_{22}$ fatty acids or fatty alcohols having up to 80% ethylene oxide; polyoxyethylene-polyoxypropylene block polymers having 10–80 weight percent ethylene oxide and a molecular weight of 900–16,000; fatty alkyl aryl sulfonates of 6 to 20 carbons in the fatty group; $C_{10}$ to $C_{22}$ fatty acid soaps of an alkali metal or ammonia, $C_{10}$ to $C_{22}$ fatty sulfates; $C_{10}$ to $C_{22}$ fatty sulfonates; $C_{10}$ to $C_{22}$ fatty amine oxides; fatty imidazolines of $C_6$ to $C_{20}$ carbon atoms in the fatty group, fatty amido sulfobetaines having 20 to 22 carbon atoms in the fatty group, fatty ammonium compounds having 20 to 22 carbon atoms, $C_{10}$ to $C_{22}$ fatty morpholine oxides, alkali metal salts of carboxylated ethoxylated $C_{10}$ to $C_{22}$ alcohols, ethylene oxide condensates of $C_{10}$ to $C_{22}$ fatty acid monoesters of glycine and $C_{10}$ to $C_{22}$ fatty acid mono, and diethanol amides.

The Rosano patent indicates that the secondary surfactant can be selected from the group consisting of ethoxylated sorbitan monoesters of $C_{12}$–$C_{18}$ fatty esters, ethoxylated sorbitol monoesters of $C_{12}$–$C_{18}$ fatty acids, ethoxylated nonylphenol having 8–15 ethylene oxide units per mol and lauryl alcohol-6-ethylene oxide.

U.S. Pat. No. 4,568,480 to Thir, et al. is directed to a microemulsion of water and an alkoxylated phenol derivative which may also contain an oil and an additional surfactant.

U.S. Pat. No. 4,835,002 to Wolf, et al. is directed to an edible concentrated microemulsion of an edible essential oil in a matrix of water and alcohol. The alcohol is selected from the group consisting of ethanol, propylene glycol, glycerine, sugar, sugar alcohol and mixtures thereof. The microemulsion contains from about 1 to about 25% of the essential oil, from about 1 to about 30% of at least one surfactant and at least 25 to 80% of the alcohol, with the balance being water. The Wolf, et al. patent also includes a long list of surfactants which can be used in the microemulsions of the Wolf, et al. patent. While the Wolf, et al. patent provides a simple method for producing microemulsions from a number of essential oils, not all water immiscible oils can be made into microemulsions utilizing the surfactants and alcohols of the Wolf, et al. patent.

U.S. Pat. No. 5,045,337 to El-Nokaly, et al. discloses microemulsions which are thermodynamically stable, clear and homogeneous which are made from a polar solvent, a specific polyglycerol mono, diester and a lipid. The microemulsions of the El-Nokaly, et al. patent contain from 90% to 99.8% lipid material and from about 0.1% to about 5% of a polar solvent. The polar solvent can be selected from the group consisting of water, glycerine, propylene glycol and dipropylene glycol.

Accordingly, it is a principal object of the present invention to provide a simple method for the preparation of microemulsions from food oils which do not form microemulsions in a matrix and an alcohol selected from the group consisting of ethanol, propylene glycol, glycerine, sugar, sugar alcohol and mixtures thereof.

SUMMARY OF THE INVENTION

The present invention is directed to an edible microemulsion which includes an oil which cannot be formed into a microemulsion in a matrix of water and an alcohol selected from the group consisting of ethanol, propylene glycol, glycerine, sugar, sugar alcohol and mixtures thereof, a hydrophilic surfactant, a first water miscible alcohol emulsifying agent, a second water immiscible alcohol emulsifying agent and water.

DETAILED DESCRIPTION OF THE INVENTION

The present invention provides an extremely simple method for preparing microemulsions, which method does not require any mixing steps.

As used herein, the term "oil" for use in the microemulsions of the invention include non-miscible fluid substances which are utilized in the food industry for flavoring purposes, as well as mixtures of such immiscible food flavorings and triglyceride oils. The oils of the present invention do not form microemulsions in a matrix of water and an alcohol selected from the group consisting of ethanol, propylene glycol, glycerine, sugar, sugar alcohol and mixtures thereof, i.e., the oils to which the method of the present invention is directed are those oils which cannot be formed into microemulsions utilizing the method disclosed in the Wolf, et al. patent discussed hereinabove. Examples of such oils are aromatized coffee oil and oil-soluble egg flavor. The oil is present in the microemulsion of the present invention at a level of from about 1% to about 25% and most preferably from about 5% to about 15%. All percentages used herein are by weight unless otherwise indicated.

The preparation of the microemulsions of the present invention relies upon the interaction of a hydrophilic surfactant, a first water miscible alcohol emulsifying agent and a second water immiscible alcohol emulsifying agent in an oil/water system. The microemulsions of the present invention are easily prepared by simply combining the various components followed by a brief period of low shear mixing.

Any of the well known hydrophilic surfactants used to make oil/water emulsions can be used, such as polyoxyethylene (20) sorbitan monooleate (Tween 80), polyoxyethylene (20), sorbitan monostearate (Tween 60), polyglycerol esters of fatty acids and sugar esters. In general, the hydrophilic surfactant will be present at relatively high levels of from about 20% to about 35%.

The first water miscible alcohol emulsifying agent is a short chain alcohol. The first water miscible alcohol emulsifying agent is preferably selected from the group consisting of ethanol, propanol and propylene glycol. The first water miscible alcohol emulsifying agent is present at a level of from about 10% to about 15%.

The second water immiscible alcohol emulsifying agent is a higher chain alcohol preferably selected from the group of $C_8$-$C_{14}$ primary alcohols, most preferably dodecanol. The second water immiscible alcohol emulsifying agent is present at a level of from about 5% to about 15% of the microemulsion. The second water immiscible alcohol emulsifying agent is soluble in the first water miscible alcohol and is also soluble in the oil.

The microemulsions of the invention also include from about 35% to about 50% of water.

It is an important aspect of the present invention that the ratio of total alcohol to surfactant is in the range of from about 0.4:1 to about 1.2:1. These ratios are very low compared to prior art microemulsions and are indicative of the high levels of use of the hydrophilic surfactant required to form microemulsions of this class of oils to which the present invention is directed.

The following examples further illustrate various features of the invention, but are intended to in no way limit the scope of the invention as set forth in the appended claims.

EXAMPLE 1

Various compositions were prepared from an aromatized coffee oil (ACO) and an oil soluble egg flavor (EF). The compositions were prepared by combining all of the components set forth in Table 1 hereinbelow and gently mixing the components with a spatula.

TABLE 1

| Example 1 | Example 2 | Example 3 |
| --- | --- | --- |
| 1.0 g ACO | 1.0 g ACO or EF | 1.0 g ACO or EF |
| 4.0 g Tween 80 | 4.0 g Tween 80 | 4.0 g Tween 80 |
| 6.0 g Water | 6.0 g Water | 6.0 g Water |
| 2.4 g Butanol | 4.0 g Glycerol | 4.0 g Ethanol |
| Example 4 | Example 5 | Example 6 |
| 1.0 g ACO or EF | 1.0 g ACO or EF | 1.0 g ACO or EF |
| 4.0 g Tween 80 | 4.0 g Tween 80 | 4.0 g Tween 80 |
| 6.0 g Water | 6.0 g Water | 6.0 g Water |
| 1.5 g Ethanol | 4.0 g Prop. glycol | 1.5 g Ethanol |
| 3.5 g Glycerol | | 4.0 g Prop. glycol |
| Example 7 | Example 8 | Example 9 |
| 1.0 g ACO or EF | 1.0 g ACO | 1.0 g ACO or EF |
| 4.0 g Tween 80 | 4.0 g Tween 80 | 4.0 g Tween 80 |
| 6.0 g Water | 6.0 g Water | 6.0 g Water |
| 2.0 g Dodecanol | 1.5 g Butanol | 2.0 g Ethanol |
| | 1.5 g Dodecanol | 1.0 g Pentathenol |
| Example 10 | — | |
| 1.0 g ACO | | |
| 4.0 g Tween 80 | | |
| 6.0 g Water | | |
| 0.7 g Dodecanol | | |
| 2.0 g Prop. glycol | | |

None of Samples 1–10 produced a microemulsion of the aromatized coffee oil (ACO) or the oil soluble egg flavor (EF). It is not possible to produce oil/water microemulsions of the ACO and EF using ethanol, propylene glycol, glycerol.

EXAMPLE 2

The following components were combined with the indicated levels of ethanol and dodecanol as set forth in Table 2.

TABLE 2

| Example 11 | Example 12 | Example 13 |
| --- | --- | --- |
| 1.0 g ACO | 1.0 g ACO | 1.0 g ACO or EF |
| 3.0 g Tween 80 | 3.0 g Tween 80 | 4.0 g Tween 80 |
| 4.0 g Water | 4.0 g Water | 6.0 g Water |
| 1.5 g Ethanol | 1.5 g Ethanol | 1.5 g Ethanol |
| 1.5 g Dodecanol | 0.7 g Dodecanol | 0.7 g Dodecanol |
| Example 14 | Example 15 | Example 16 |
| 1.0 g ACO | 1.0 g ACO | 1.0 g EF |
| 3.5 g Tween 80 | 3.0 g Tween 80 | 4.0 g Tween 80 |
| 7.0 g Water | 6.0 g Water | 6.0 g Water |
| 1.5 g Ethanol | 1.5 g Ethanol | 1.5 g Ethanol |
| 1.2 g Dodecanol | 1.7 g Dodecanol | 0.8 g Dodecanol |

All of the above samples 11–16 provided an O/W microemulsion.

The various weight ratios of the constituents of the microemulsions of Examples 11–16 are tabulated in the following Table:

TABLE 1

| Example | Total Wt in Grams | Oil/ Surfactant | Ratio of Alcohol/ Surfactant | Alcohol/ Water |
| --- | --- | --- | --- | --- |
| 11 | 11.0 | 0.33 | 1.00 | 0.75 |
| 12 | 10.2 | 0.33 | 0.73 | 0.55 |
| 13 | 13.2 | 0.25 | 0.55 | 0.36 |
| 14 | 14.2 | 0.29 | 0.77 | 0.39 |
| 15 | 12.57 | 0.33 | 0.86 | 0.43 |

TABLE 1-continued

| Example | Total Wt in Grams | Oil/ Surfactant | Ratio of Alcohol/ Surfactant | Alcohol/ Water |
| --- | --- | --- | --- | --- |
| 16 | 13.3 | 0.25 | 0.58 | 0.38 |

What is claimed is:

1. An edible microemulsion comprising the following components:
   (a) an oil which does not form microemulsions in a matrix of water and an alcohol selected from the group consisting of ethanol, propylene glycol, glycerine, sugar, alcohol and mixtures thereof;
   (b) a hydrophilic surfactant which is present at a level of from about 20% to about 35% by weight,
   (c) a first water miscible alcohol emulsifying agent which is present at a level of from about 10% to about 15% by weight,
   (d) a second water immiscible alcohol emulsifying agent which is present at a level of from about 5% to about 15% by weight, and
   (e) water,
said components being present at a level sufficient to total one hundred percent and being present at a level sufficient to form said microemulsion.

2. An edible microemulsion in accordance with claim 1 wherein said hydrophilic surfactant is selected from the group consisting of polyoxyethylene (20) sorbitan monooleate, polyoxyethylene (20) sorbitan monostearate, polyglycerol esters of fatty acids and sugar esters.

3. An edible microemulsion in accordance with claim 1 wherein said first water miscible alcohol emulsifying agent is selected from the group consisting of ethanol, propanol and propylene glycol.

4. An edible microemulsion in accordance with claim 1 wherein said second water immiscible alcohol emulsifying agent is selected from $C_8$–$C_{14}$ primary alcohols.

5. An edible microemulsion in accordance with claim 1 wherein said second water immiscible alcohol emulsifying agent is dodecanol.

6. An edible microemulsion in accordance with claim 1 wherein said water is present at a level of from about 35% to about 50% by weight.

7. An edible microemulsion in accordance with claim 1 wherein the ratio of total alcohol emulsifying agents to surfactant is in the range of from about 0.4:1 to about 1.2:1.

* * * * *